3,268,510
PROCESS FOR DISSOLVING INSOLUBILIZED CYANAMIDE REACTED STARCH
Daniel Elmer Nagy, Stamford, Conn., assignor to American Cyanamid Company, Stamford, Conn., a corporation of Maine
No Drawing. Filed May 13, 1963, Ser. No. 280,092
6 Claims. (Cl. 260—233.3)

The present invention relates to the solubilization of dry, originally water-soluble cationic nitrogenated and particularly cyanamide-reacted starch which has self-reacted and thereby become water-insoluble.

In the past, starch has been used as an adjunct in the manufacture of paper, and has been valued for its ability to increase the dry strength of water-laid cellulose products. It is generally added at a point upstream from the Fourdrinier wire of the papermaking machine and when present on the fibers causes the resulting paper to have a substantially higher dry tensile strength than that which it would otherwise have.

More recently, it has been found that the efficiency of starch for this purpose is increased when the starch has a reacted content of cyanamide; see Elizer et al. U.S. Patents Nos. 3,051,691 and 3,051,698–700 of August 28, 1962. The resulting starch is cellulose-substantive and thus attaches itself directly to cellulose fibers when added to an aqueous suspension of cellulose fibers, as a result of which the efficiency of the starch for papermaking purposes is sensibly increased.

In general, the cationic starch of these patents is prepared by reacting a starch in aqueous medium with a dissolved cyanamide. When the optimum amount of cyanamide is used, the starch contains between about 0.2% and 0.5% by weight of nitrogen (by Kjeldahl analysis). The starch has basic properties and reacts with acids to form salts.

The form in which the cyanamide is present in this starch (with or without acid) is not known, and for convenience this starch is termed herein "originally water-soluble cationic cyanamide-reacted starch."

It is a disadvantage of this starch that in dry state it is storage-unstable. It changes to water-insoluble form so that it is not dissolved even by water virtually at the boil. In some instances insolubilization occurs as the starch dries, particularly when the drying is performed at elevated tempearture, and in other instances, particularly when converted to salt state, the starch remains stable for as long as two months. However, in any event the starch changes to water-insoluble state with sufficient speed so that its practical utilization on a commercial scale is seriously hindered. The exact reason why this insolubilization occurs is not known, but is evidently the result of self-reaction as the insolubilization occurs rapidly at elevated temperature and slowly at room temperature in the absence of added reagents. It is thought that this insolubilization is due to cross-linking caused by the reacted cyanamide.

It is known that hot dilute strong acids have the capacity of degrading or depolymerizing starch so that it loses its effectiveness as dry strength agent for paper. The present invention results from the discovery that hot dilute strong acids have the capacity of solubilizing the aforementioned insoluble cyanamide reacted starch without hydrolyzing (or otherwise inactivating) the cyanamide groups therein and without significantly degrading or depolymerizing the starch so as to decrease its effectiveness as a dry strength agent for paper by more than a slight amount.

Hence, according to the invention this insoluble starch is slurried with a hot dilute solution of a strong acid (i.e., an acid having a pK less than about 2) until the starch has substantially all dissolved. When it is not desired to use the solution at once, the solution is neutralized so as to stop the action of the acid.

This solution should be hot but need not be at the boil. Good results are obtained when the tempearture of the solution is in the range of 75° C. to 95° C. and this range is, therefore, preferred.

Solubilization generally occurs quickly and in preferred instances takes place in less than 10 minutes. The resulting solution appears to be closely similar to the parent solution, i.e., the solution in which the cyanamide-starch is first prepared.

As acids, sulfuric acid, hydrochloric acid and nitric acid are suitable, and because of their ready availability and cheapness, they are preferred.

Other strong acids which have a pK of less than 2 can be used such as, for example, phosphoric acid, trichloroacetic acid, and p-toluenesulfonic acid.

Only a small amount of the strong acid is needed. Good results have been obtained by the use of as little as $\frac{1}{10}\%$ of the acid based on the weight of the starch. On the other hand, it has not been found necessary to use acid in excess of 10% based on the weight of the starch. The starch:water ratio is not important and can be adjusted for convenience. In general, the amount of water used is that which yields a fluid solution and the amount of acid should be sufficient so that the aqueous medium after completion of the reaction has a pH less than 2.

The product of the solubilizing step is a fluid, cloudy or opalescent cationic starch solution having a pH less than 2. It may be used in that condition if used promptly, but it is generally more convenient to neutralize the solution so as to permit it to be stored. This may be done by adding sufficient alkali to arrest the action of the acid or to slow the action to an acceptable rate. For this purpose it is generally sufficient to raise the pH of the solution to a value between about 6 and 8.

The invention is further illustrated in the examples which follow. These examples constitute embodiments of the invention and are not to be construed as limitations thereon.

*Preparation of cyanamide-reacted starch.*—The following illustrates the preparation of a number of originally water-soluble cationic cyanamide-starch reaction products and shows how they become water-insoluble on drying and aging.

Insolubility is determined by agitating a small amount of the dry cyanamide-starch reaction product with hot water in a beaker placed on a steam bath (which provides a temperature of about 90°–95° C. without danger of scorching the starch). The starch is rated as insoluble when it remains undissolved after 30 minutes of agitation in the water.

*Insoluble cyanamide-reacted starch A.*—To 300 ml. of water are added 100 ml. of a 22% by weight solution of free cyanamide in water (0.5 mol) and 108 ml. of a 10% by volume solution of NaOH in water. To this is added with stirring 400 g. (2.5 mols) of pearl corn starch (an ungelatinized granular starch). The resulting fluid slurry is maintained at 20° C. for 18 hours, at the end of which time reaction of the cyanamide with the starch is substantially complete. The pH of the mixture is 11.4. To the eye, the suspended starch appears unchanged by the process.

The solution is neutralized to pH 6.5 and the suspension is filtered, washed with water and tray dried at 35° C. The product is insoluble in water at 90°–95° C.

A sample is washed and on Kjeldahl analysis is found to contain 0.50% N by weight.

*Insoluble cyanamide-reacted starch B.*—To 500 ml. of water are added with stirring 22 g. (0.3 mol) of crystalline sodium hydrogen cyanamide (NaHNCN) and 400 g.

(2.5 mols) of raw starch which has been acid-hydrolyzed from a fluidity of 1 to a fluidity of 10. The mixture is maintained at 40° C. for three hours, at the end of which time reaction of the starch is substantially complete. The solution is neutralized with acetic acid and the granules are filtered, washed and air-dried.

The product is similar to the product of Example 1 but is water-soluble. At the end of a month of storage at room temperature it is insoluble in water at 90°–95° C.

*Insoluble cyanamide-reacted starch C.*—To 500 ml. of water are added with stirring 40 g. (0.3 mol) of commercial (fertilizer grade) calcium cyanamide ground to 100 mesh, and to this is added 400 g. (2.5 mols) of pearl corn starch. The pH of the mixture is 10.5. The mixture is maintained at 40° C. for 15 hours, at which point reaction of the starch with the cyanamide is substantially complete. The product is neutralized. The starch is filtered off, and is washed and dried at room temperature. By Kjeldahl analysis it is found to contain 0.3% N. After one week at room temperature, the material is insoluble in water at 90°–95° C.

*Insoluble cyanamide-reacted starch D.*—To 250 cc. of water at 39° C. containing 12.5 g. of sodium chloride are slowly added with stirring 35 g. of fertilizer grade calcium cyanamide ground to about 100 mesh, followed immediately by 200 g. of corn starch. The mixture is maintained at 39° C. for three hours with constant slow stirring. The pH of the mixture is decreased to 3.1 by addition of hydrochloric acid, and the starch is filtered off. The starch is in its original granular form, but is water-soluble and cationic. After a month it is insoluble in water at 90°–95° C.

*Insoluble cyanamide-reacted starch E.*—10 g. of granular corn starch in 100 ml. of water containing 5 g. of free cyanamide and sufficient alkali to produce a pH of 10.5 is heated for 7 minutes at 90° C., cooled to room temperature, neutralized to pH 6.5 and dried on a laboratory drum drier having a drum temperature of 120° C. The product as obtained is insoluble in water at 90°–95° C.

*Example 1*

The following illustrates the solubilization of the above-described insoluble starches by the use of a strong acid.

The following procedure is used.

To 500 ml. of water at the temperature shown in the table below is added sufficient dilute mineral acid to form a solution containing the percent of acid shown in the table below. There is then added sufficient of the indicated starch to provide the percentage shown in the table. The mixture is stirred at the indicated temperature and is observed from time to time.

The time required for the starch to dissolve is judged by substantial disappearance of solid or swollen starch granular or particles from the solution.

Results are as follows:

| Starch Used | Per-cent [1] | Acid Solution | | | | Minutes to Dissolve |
|---|---|---|---|---|---|---|
| | | Acid | | | Temp., °C. | |
| | | Name | Per-cent [1] | Per-cent [2] | | |
| A | 4 | HCl | 0.04 | 1 | 90 | <10 |
| A | 4 | HCl | 0.12 | 3 | 90 | <10 |
| B | 4 | H₂SO₄ | 0.2 | 5 | 88 | 30 |
| B | 4 | HNO₃ | 0.14 | 3.5 | 88 | 10 |
| C | 3 | HCl | 0.2 | 6.6 | 90 | 15 |
| D | 4 | HNO₃ | 0.2 | 5 | 90 | 15 |
| E | 6 | HCl | 0.3 | 5 | 90 | 20 |

[1] On weight of the water.
[2] On weight of the starch.

In each instance a clear, fluid solution is obtained which has a pH less than 2 and which, when adjusted to pH 6–8, is stable for at least several months.

The dry strength imparted to paper by the resolubilized starches shown above is in excess of 80% of the dry strength imparted by the parent cationic starches before they had become insoluble.

*Example 2*

The following illustrates the comparative results afforded by the present invention in terms of the effectiveness of the resolubilized starches as dry strength agents for paper.

Samples of starches A and B are prepared, and their effectiveness as dry strength agents is determined by standard laboratory procedure by forming a suspension of 50:50 bleached sulfite-bleached hardwood kraft paper-making fibers at pH 7.0, adding thereto 1% (based on the dry weight of the fibers) of one of the starches, forming the suspension into a sheet, and drying the sheet for 1 minute at 100° C. The procedure is repeated using as control a laboratory reference sample of a cationic starch known to be stable and containing no reacted cyanamide.

The procedure is repeated again after the cyanamide-reacted starches have become largely insoluble and have been resolubilized by use of the acids shown in the table below.

Results are as follows:

| Run No. | Starch Used | Solubilizing Acid | | Paper Dry Tensile Strength, Percent of Standard | | |
|---|---|---|---|---|---|---|
| | | Name | Per-cent [1] | Starch | | Percent Change |
| | | | | Orig. | Resol. | |
| 1 | A | None | | 90 | [2](2.7) | −96.9 |
| 2 | A | H₂SO₄ | 1 | 90 | 86.5 | −3.9 |
| 3 | A | HCl | 2 | 90 | 89 | −1.1 |
| 4 | B | None | | 95 | [3](54) | −46.2 |
| 5 | B | HCl | 1.5 | 95 | 90 | −5.3 |

[1] On dry weight of the starch.
[2] Stirred with hot water in absence of acid. Starch did not appear to dissolve at all.
[3] Starch had not become completely insoluble.

*Example 3*

The following illustrates the solubilization of insolubilized cyanamide-starch in two steps to show the effect of an insufficient amount of acid in the first step and the effect of a sufficient amount in the second step.

To 500 ml. of water at 90° C. is added 6 ml. of 10% aqueous HCl and 50 g. of cationic starch B in dry water-insoluble state. The mixture is stirred at 90° C. for 50 minutes but the starch does not dissolve. The granules swell but do not dissolve, and the mixture is viscous and translucent but not clear.

There is then added 10 ml. of 10% HCl and stirring is continued. After eight minutes no swollen granules can be seen, and the mixture appears to be a clear homogeneous solution.

The pH of the solution is 1.4. The solution is neutralized with aqueous NaOH.

*Example 4*

The procedure of Example 3 is repeated except that the acid used is p-toluenesulfonic acid.

Similar results are obtained.

I claim:

1. A process of dissolving an originally water-soluble storage-unstable cationic cyanamide-reacted starch which has self-reacted and thereby become water-insoluble, while substantially preserving its normal effectiveness as dry strength agent for paper, which comprises: slurrying said starch in a hot dilute solution of a strong acid which has a pK less than 2 until said starch has substantially all dissolved; the amount of said acid being such that said solution has a pH less than 2 when said starch has substantially all dissolved.

2. A process according to claim 1 wherein the temperature of the mineral acid solution is betewen 75° C. and 95° C.

3. A process according to claim 1 wherein the strong acid is hydrochloric acid.

4. A process according to claim 1 wherein the weight of said strong acid is between 1% and 10% of the weight of the starch.

5. A process of dissolving an originally water-soluble storage-unstable cationic cyanamide-reacted starch which has self-reacted and thereby become water-insoluble, while substantially preserving its normal effectiveness as dry strength agent for paper, which comprises: slurrying said starch in a hot dilute solution of a strong acid which has a pK less than 2 until said starch has substantially all dissolved, and then substantially neutralizing the resulting solution; the amount of said acid being such that said solution has a pH less than 2 when said starch has substantially all dissolved.

6. A process according to claim 5 wherein the resulting solution is neutralized to pH 6–8.

References Cited by the Examiner
UNITED STATES PATENTS
3,051,700   8/1962   Elizer _____ 260—233.3

LEON J. BERCOVITZ, *Primary Examiner.*

R. W. MULCAHY, *Assistant Examiner.*